United States Patent
Kimiabeigi

(10) Patent No.: US 9,419,480 B2
(45) Date of Patent: Aug. 16, 2016

(54) ROTOR ARRANGEMENT AND ELECTROMECHANICAL TRANSDUCER HAVING NON-PARALLEL PERMANENT MAGNETS

(71) Applicant: Mohammad Kimiabeigi, Sheffield (GB)

(72) Inventor: Mohammad Kimiabeigi, Sheffield (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 316 days.

(21) Appl. No.: 13/865,364

(22) Filed: Apr. 18, 2013

(65) Prior Publication Data

US 2013/0278087 A1  Oct. 24, 2013

(30) Foreign Application Priority Data

Apr. 20, 2012 (EP) .................................. 12164938

(51) Int. Cl.
| H02K 1/28 | (2006.01) |
| H02K 1/27 | (2006.01) |
| H02K 29/03 | (2006.01) |

(52) U.S. Cl.
CPC ................ *H02K 1/27* (2013.01); *H02K 1/2786* (2013.01); *H02K 29/03* (2013.01); *H02K 2201/06* (2013.01); *Y02E 10/725* (2013.01)

(58) Field of Classification Search
CPC ........... H02K 1/27; H02K 1/22; H02K 1/223; H02K 1/06; H02K 1/2786; H02K 15/00; H02K 15/02; H02K 1/278; H02K 1/276; H02K 15/03; H02K 21/00; H02K 21/028; H02K 21/24; H02K 21/10; H02K 21/04; H02K 37/10; H02K 41/03; H02K 2201/06; Y10T 29/49009; Y10T 29/49012

USPC ................... 310/46, 51, 152, 156.01–156.84; 29/596, 298, 732, 428, 607
See application file for complete search history.

(56) References Cited

U.S. PATENT DOCUMENTS

| | | | | |
|---|---|---|---|---|
| 4,242,610 A * | 12/1980 | McCarty et al. | ......... | 310/156.59 |
| 4,598,221 A * | 7/1986 | Lawson et al. | ................ | 310/103 |
| 5,034,642 A * | 7/1991 | Hoemann et al. | ........ | 310/156.47 |
| 5,306,977 A * | 4/1994 | Hayashi | ................. | H02K 1/243 |
| | | | | 310/192 |
| 5,355,044 A * | 10/1994 | Uchida et al. | ................. | 310/162 |
| 5,386,161 A * | 1/1995 | Sakamoto | ................. | 310/49.53 |
| 5,397,951 A * | 3/1995 | Uchida et al. | ............ | 310/156.21 |
| 5,483,116 A * | 1/1996 | Kusase | ................ | H02K 21/044 |
| | | | | 310/156.66 |
| 5,578,885 A * | 11/1996 | Alford et al. | .................. | 310/263 |
| 5,677,587 A * | 10/1997 | Sakashita et al. | ........ | 310/154.28 |
| 6,013,968 A * | 1/2000 | Lechner | ............... | H02K 21/044 |
| | | | | 310/181 |
| 6,331,746 B1 * | 12/2001 | Fujitani et al. | ................ | 310/263 |

(Continued)

FOREIGN PATENT DOCUMENTS

| DE | 19829052 C1 | 12/1999 |
| EP | 0718959 A2 | 6/1996 |

*Primary Examiner* — Dang Le

(57) ABSTRACT

A rotor arrangement includes a support structure providing a mounting surface extending in an axial direction and a circumferential direction. The support structure is adapted to rotate around the axial direction. A first permanent magnet system is arranged at the mounting surface at a first circumferential region. A second permanent magnet system is arranged at the mounting surface at a second circumferential region. A circumferential distance between the first magnet system and the second magnet system at a first axial position differs from the circumferential distance between the first magnet system and the second magnet system at a second axial position.

17 Claims, 6 Drawing Sheets

(56) References Cited

U.S. PATENT DOCUMENTS

| | | |
|---|---|---|
| 6,384,503 B1 * | 5/2002 | Iwaki et al. .............. 310/156.47 |
| 6,727,629 B1 * | 4/2004 | Soghomonian et al. ... 310/254.1 |
| 2002/0067092 A1 * | 6/2002 | Crapo et al. ............. 310/156.47 |
| 2006/0186754 A1 * | 8/2006 | Kitamura ............. H02K 21/028 310/263 |
| 2010/0277026 A1 * | 11/2010 | Yamaguchi et al. ..... 310/156.25 |

* cited by examiner

ROTOR ARRANGEMENT AND ELECTROMECHANICAL TRANSDUCER HAVING NON-PARALLEL PERMANENT MAGNETS

CROSS REFERENCE TO RELATED APPLICATIONS

The present application claims priority to European Patent Office application No. 12164938.8 EP filed Apr. 20, 2012, the entire content of which is hereby incorporated herein by reference.

FIELD OF INVENTION

The present invention relates to a rotor arrangement and to an electromechanical transducer, in particular a generator, wherein permanent magnets are arranged in a non-parallel manner skewed or inclined relative to an axial direction.

BACKGROUND OF INVENTION

An electromechanical transducer, such as an electro motor or a generator converts mechanical energy (in particular rotational energy) into electrical energy or vice versa. Thereby, a stator portion may comprise annularly arranged teeth around which conductors are wound to form plural annularly arranged coils. In particular, the teeth and the coils may be arranged in a cylindrical configuration.

A rotor arrangement may rotate around an axis at the center of the circle relative to the stator portion. The rotor arrangement may comprise plural permanent magnets or permanent magnet systems. Upon rotation of the rotor arrangement relative to the stator, voltages may be induced in the coils due to the moving permanent magnets. The induced voltages may provide electric energy.

In the electromechanical transducer or in the electrical machine a number of vibrations or vibrational modes may occur during operation. The vibration may be due to the interaction of the magnetic flux waves with the stator slotting, i.e. cogging torque. A conventional method to reduce such vibration, in particular torsional vibration, is to skew or incline the magnets with respect to the axial direction with an appropriate skew angle which may be based on the tooth pitch of the stator portion.

However, it has been observed that the conventional electrical machine or conventional electromechanical transducer or conventional rotor arrangement used for an electromechanical transducer is not capable to reduce all kinds of vibration occuring during operation appropriately. In particular, the conventional electromechanical transducer may still exhibit a significant axial vibration during operation.

There may be a need for a rotor arrangement and for an electromechanical transducer, in particular generator, wherein vibration of the electromechanical transducer is reduced and wherein in particular a reduced axial vibration occurs.

SUMMARY OF INVENTION

The need is satisfied by the subject matter of the independent claims. The dependent claims specify advantageous embodiments of the present invention.

According to an embodiment of the present invention it is provided a rotor arrangement, comprising: a support structure providing a mounting surface extending in an axial direction and a circumferential direction, the support structure being adapted to rotate around the axial direction; a first permanent magnet system arranged at the mounting surface at a first circumferential region; a second permanent magnet system arranged at the mounting surface at a second circumferential region; wherein a circumferential distance between the first magnet system and the second magnet system at a first axial position differs from the circumferential distance between the first magnet system and the second magnet system at a second axial position.

The rotor arrangement may be used in an electromechanical transducer, such as an electromotor or an electric generator. The electric generator may in particular be used for a wind turbine in order to convert the mechanical energy resulting from impact of wind onto plural rotor blades to electrical energy which may then be supplied to a utility grid, which may then in turn provide the electrical energy to a plurality of consumers.

In particular, the rotor arrangement may constitute a circumferential section from which an annular rotor arrangement may be assembled. Alternatively, the rotor arrangement may represent a complete annular structure, in particular a cylindrical structure having as a principal (cross-sectional) shape a circular shape.

The support structure may be provided for supporting or holding or mounting the permanent magnet systems. The axial direction may correspond (or may be parallel) to a rotational axis around which the rotor arrangement is intended to be rotated during operation, when the rotor arrangement is used for or assembled into an electromechanical transducer. The circumferential direction is perpendicular to the axial direction and a radial direction is perpendicular to the axial direction and also perpendicular to the circumferential direction.

In a complete annular rotor arrangement plural permanent magnet systems may be arranged side by side along the circumferential direction in order to be evenly spaced apart and in order to be distributed evenly around the entire circumference, i.e. the circular circumference of the complete rotor arrangement. In particular, the rotor arrangement may be either an outer rotor arrangement, in which the rotor arrangement is intended to be arranged radially outwards from a stator portion, or may be adapted as an inner rotor arrangement, which is intended to be arranged radially inwards relative to a stator, when assembled into an electromechanical transducer.

The first (and/or the second) permanent magnet system may either be constituted by a single integrally formed magnet or may be constituted by a plurality of individual magnets which are arranged side by side, in particular adjacent to each other, along the axial direction or along a direction inclined relative to the axial direction. The first permanent magnet system as well as the second permanent magnet system may be fixed to the amounting surface using appropriate fixing equipment, such as skews or boles.

In particular, the first permanent magnet system may be assigned a first main extension direction being the direction along which the first permanent magnet system extends. Thereby, the main extension direction may be defined by a straight line, which best fits plural cross-sectional centers of plural axial cross-sections of the first permanent magnet system. Thereby, the cross-section center may be in particular defined as a geometrical cross-sectional center or a mass center or magnetic center of the considered axial cross-section of the first permanent magnet system. In particular, the first main extension direction of the first permanent magnet system may either be parallel to the axial direction or may be inclined relative to the axial direction by a skew angle defining a deviation of the first main extension direction in the circumferential direction with respect to the axial direction.

A second main extension direction may also assigned to the second permanent magnet system in an analogous way. In particular, the second main extension direction may be parallel to the axial direction or may be inclined relative to the axial direction by (in particular another) skew angle defining a deviation of the second main extension direction in the circumferential direction from the axial direction.

In particular, the first permanent magnet system and the second permanent magnet system may be arranged at the mounting surface such that the first main extension direction is not parallel to the second main extension direction. The distance between the first magnet system and the second magnet system at a particular axial position may relate to a distance between the cross-sectional center of the first magnet system and the cross-sectional center of the second magnet system at the considered axial position or may relate to a distance between an edge of the first magnet system and an edge of the second magnet system. Further, the distance between the first magnet system and the second magnet system may relate or may be equal to a distance between a magnetic center of a cross-section of the first magnet system at the considered axial position and a magnetic center of a cross-section of the second magnet system at the considered axial position.

Due to the different circumferential distances between the first magnet system and the second magnet system at the first axial position and the second axial position, respectively, the first magnet system and the second magnet system do not run parallel to each other, in particular the first main extension direction does not run parallel to the second main extension direction.

With such an arrangement of the first permanent magnet system and the second permanent magnet system a torsional vibration of an electromechanical transducer may be reduced, while no significant axial vibration is caused. In particular, the first permanent magnet system and the (circumferentially adjacent) second permanent magnet system may form a magnet pole pair.

According to an embodiment of the present invention the first permanent magnet system is inclined with respect to the axial direction in the circumferential direction, in particular by a skew angle, wherein the second permanent magnet system is inclined with respect to the axial direction in an opposite circumferential direction, in particular by the skew angle.

In particular, the first main extension direction of the first permanent magnet system may be inclined with respect to the axial direction in the circumferential direction and in particular the second main extension direction of the second permanent magnet system may be inclined with respect to the axial direction in an opposite circumferential direction. Further, the inclination relative to the axial direction may have a same amount but may have different sign, i.e. when the first permanent magnet system is inclined by an angle +Φ relative to the axial direction the second permanent magnet system may be inclined with the angle −Φ relative to the axial direction.

In this particular configuration or arrangement of the permanent magnet systems the tangential force component due to magnet flux interaction with the stator slotting may be balanced out along the axial length, resulting in zero or very small net resultant force in the tangential (circumferential) direction, minimizing the torsional vibration and acoustic noise emission. Thus, forces acting on the first permanent magnet system in the radial direction may be cancelled out when summing all forces along the extension of the first permanent magnet system. Further, also all forces, in particular radial forces acting on the second permanent magnet system may be cancelled out, when summing all forces along the extension of the second permanent magnet system.

In addition and in particular in contrast to a conventional system, also the forces exerted on the (neighbouring or adjacent) first permanent magnet system and the second permanent magnet system at a particular axial position may cancel out due to the inclination of the first permanent magnet system and the second permanent magnet system in different directions relative to the axial direction. I.e., when considering a particular axial position, the (radial) forces acting on the plural magnet system of the rotor arrangement may cancel out, when summing along the circumferential direction (over at least two or plural magnet systems). Thereby, a global axial vibration of the rotor structure may be reduced. In particular, a circumferential mode of order "1" or a vibration according to a circumferential mode of order "1" may be reduced, since the excitation forces of all permanent magnets in the circumferential direction do not have the same orientation anymore (i.e. either all pointing radially outwards or all pointing radially inwards) but have alternating orientations, such that one force at the first permanent magnet system may point radially outwards and the force acting on the second permanent magnet system may point radially inwards, such that a net force of zero results, when summing around or along the circumferential direction.

Thus, a lower order vibration mode (i.e. the circumferential vibration mode of order "1") may be reduced, which may increase the stiffness of the structure, in order to reduce vibration amplitude and acoustic noise emission. Further, a (1, 1) vibration mode, the first element indicating the circumferential mode and the second element indicating the axial mode of vibration may be reduced. In particular, the axial vibration may be significantly reduced.

In a conventional Herring-Bone magnet arrangement, the magnets are skewed relative to the axial direction, but the magnets are oriented parallel to each other. The conventional Herring-Bone configuration increases the mode of the axial exciting force/vibration from (1, 1) to (1, 2) in which the force vectors change directions twice along the axial length of each magnet pole. As a result of the mode increase or the increase of the order of the mode, the axial vibration may be reduced according to this conventional configuration.

However, even though the Herring-Bone skew configuration may reduce the axial vibration, the configuration according to the embodiment of the present invention may even further reduce the axial vibration. Further, the non-parallel arrangement of the adjacent first permanent magnet system and the second permanent magnet system may be combined with the Herring-Bone skew configuration, thereby increasing its effectiveness in reducing the axial vibration.

According to an embodiment of the present invention the circumferential distance increases continuously, in particular linearly, or in a step-wise manner from the first axial position to the second axial position. When the first permanent magnet system is constituted by a single integrally formed magnet, the circumferential distance may increase continuously. In particular, the increase of the circumferential distance may be linear with the axial position such that the circumferential distance may be calculated as a constant factor times the axial position plus a constant. In contrast, when the first permanent magnet system is constituted by plural individual permanent magnets the circumferential distance may increase in a step-wise manner. Thereby, a simple way to achieve the rotor arrangement may be provided.

According to an embodiment of the present invention the circumferential distance increases continuously, in particular linearly, or in a step-wise manner from the first axial position to a third axial position, wherein the distance decreases continuously, in particular linearly, or in a step-wise manner from the third axial position to the second axial position.

Thus, the circumferential distance increases between the first axial position and the third axial position and then decreases from the third axial position to the second axial position. Thereby, the Herring-Bone type configuration may be adapted according to the non-parallel arrangement of the first permanent magnet system and the second permanent magnet system according to an embodiment of the present invention. Thereby, the axial vibration may further be reduced.

According to an embodiment of the present invention the first permanent magnet system and the second permanent magnet system extend at the mounting surface across a same axial region.

Thus, in particular, the first permanent magnet system and the second permanent magnet system may be (immediately) adjacent along the circumferential direction and may span or occupy a same axial region which may be for example defined as the axial range between the first axial position and the second axial position. Alternatively, the first axial position and the second axial position may be somewhere in between limiting axial positions bordering the axial region. Mounting the first permanent magnet system and the second permanent magnet system at the same axial region may cause an effective cancelling out of (radial) force components when summing along the circumferential direction. Thereby, the reduction of the axial vibration may even further be improved.

According to an embodiment of the present invention the first permanent magnet system comprises at least a first part arranged at the first axial position and a second part arranged at the second axial position and/or wherein the second permanent magnet system comprises at least a first part arranged at the first axial position and a second part arranged at the second axial position.

According to this embodiment the first permanent magnet system comprises at least two (in particular a plurality of) parts arranged at different axial positions. Each part of the first permanent magnet system may represent or constitute a single individual permanent magnet, wherein the single permanent magnets are physically separated from each other and are not integrally formed but may constitute distinct physical elements.

Thereby, a so-called step-wise skew configuration may be achieved, while the first main extension direction and the second main extension direction are not parallel to each other. In particular, the first main extension direction may be defined as a straight line best fitting cross-sectional centers of the first part and the second part (or of the plural parts) of the first permanent magnet system and analogous definition is provided for the second permanent magnet system when comprising a first part and a second part (or plural parts constituting individual distinct permanent magnets).

Thereby, it may not be necessary to manufacture a single first permanent magnet for constituting the first permanent magnet system which may simplify the manufacturing the rotor arrangement.

According to an embodiment of the present invention the first permanent magnet system constitutes a single first magnet and/or wherein the second permanent magnet system constitutes a single second magnet.

Thereby, mounting the first permanent magnet system may be simplified, since it may not be necessary to mount plural parts of the first permanent magnet system. Further, orienting the first permanent magnet system at the mounting surface may be simplified, e.g. by aligning an edge of the first permanent magnet with a line drawn at the mounting surface, wherein this line is inclined relative (or is parallel) to the axial direction.

According to an embodiment of the present invention the single first magnet has a straight edge, in particular along its entire axial extent, and/or wherein the single second magnet has a straight edge, in particular along its entire axial extent. The magnet having a straight edge may be manufactured in a simple manner. Further, orienting the first magnet and the second magnet at the mounting surface may be simplified by aligning the straight edges with corresponding auxiliary lines drawn at the mounting surface.

According to an embodiment of the present invention the first magnet comprises a kink between a first section and a second sections, wherein the first section and the second section extend in a different directions, wherein in particular the first section is inclined relative to the axial direction in the circumferential direction, wherein in particular the second section is inclined relative to the axial direction in the opposite circumferential direction or runs along the axial direction, wherein in particular a non-parallel Herring-Bone type arrangement is achieved.

The first section of the first magnet may span a first axial region and the second section of the first magnet may span a second axial region adjacent to the first axial region. The kink may in particular be arranged at the third axial position. The first section may be arranged between the first axial position and the third axial position and the second section may be arranged between the third axial position and the second axial position.

Also a first sectional main extension direction may be assigned to the first section of the first magnet and a second sectional main extension direction may be assigned to the second section of the first magnet. In particular, the first sectional main extension direction and the second sectional main extension direction of the first magnet may not be parallel to each other. In particular, the first sectional main extension direction and the second sectional main extension direction of the first magnet may be inclined relative to the axial direction in an opposite fashion in which the inclination may be in the circumferential direction and in the opposite circumferential direction, respectively.

Thereby, a non-parallel Herring-Bone skew configuration may be achieved. Thereby, the axial vibration may further be reduced, when the rotor arrangement is assembled into an electromechanical transducer.

According to an embodiment of the present invention the first magnet system and the second magnet system have different magnetic orientations, in particular opposite magnetic orientations. For example, the first magnet system may have a north pole oriented radially inward and a south pole oriented or arranged radially outwards. The second magnet system may have the south pole oriented radially inward and the north pole oriented or arranged radially outwards. Thereby, the first magnet system and the second magnet system may in combination form a magnet pole pair.

According to an embodiment of the present invention the rotor arrangement further comprises a third permanent magnet system arranged at the mounting surface at a third circumferential region and a fourth permanent magnet system arranged at the mounting surface at a fourth circumferential region, wherein a circumferential distance between the third magnet system and the fourth magnet system at the first axial position differs from the circumferential distance between the first magnet system and the second magnet system at the second axial position, wherein a circumferential distance between the second magnet system and the third magnet system at the first axial position differs from the circumferential distance between the second magnet system and the third magnet system at the second axial position.

In particular, the third permanent magnet system and the fourth permanent magnet system may constitute a further magnet pole pair being adjacent to the magnet pole pair constituted by the first permanent magnet system and the second permanent magnet system. The magnet pole pair and the further magnet pole pair may be (immediately) adjacent to each other in the circumferential direction.

In particular, the third permanent magnet system and/or the fourth permanent magnet system may have a same axial extent or may occupy a same axial region as the first permanent magnet system and/or the second permanent magnet system. The magnetic pole pair may be rotationally symmetry related to the further magnet pole pair, but does not need to be rotationally symmetry related.

In particular, when the magnet pole pair is rotationally symmetry related (with respect to the intended rotation axis of the rotor arrangement) to the further magnet pole pair the circumferential distance between the second magnet system and the third permanent magnet system may decrease from the first axial position to the second axial position. Further, the circumferential distance between the third permanent magnet system and the fourth permanent magnet system may increase from the first axial position to the second axial position. This configuration may in particular be achieved when the second magnet system is rotationally symmetry related around the axial direction to the fourth magnet system and when further the first magnet system is rotationally symmetry related around the axial direction to the third magnet system.

According to another embodiment of the present invention the second permanent magnet system may be rotationally symmetry related around the axial direction to the fourth permanent magnet system, but the first permanent magnet system may not be rotationally symmetry related around the axial direction to the third permanent magnet system. This may in particular be the case, when the second permanent magnet system is arranged to extend parallel to the axial direction and also when the fourth permanent magnet system is arranged to be parallel to the axial direction. In this configuration, the circumferential distance between the second permanent magnet system and the third permanent magnet system may increase (as the circumferential distance between the first permanent magnet system and the second permanent magnet system) from the first axial position to the second axial position. However, the circumferential distance between the third permanent magnet system and the fourth permanent magnet system may decrease from the first axial position to the second axial position. This configuration is in particular provided, when the first permanent magnet system is not rotationally symmetry related around the axial direction to the third permanent magnet system.

In particular, according to this last embodiment it may be avoided to reduce the width of the magnet systems too much, thereby increasing the efficiency of the electromechanical transducer, in particular the generator output energy. In particular, it may be avoided that edges of neighbouring permanent magnet systems approach each other.

According to an embodiment of the present invention it is provided an electromechanical transducer, in particular a generator which comprises a stator having plural teeth having a slot between adjacent teeth and a rotor arrangement according to one of the embodiments described above. In operation vibration of the electromechanical transducer may be reduced due to the particular constitution of the rotor arrangement having non-parallel adjacent permanent magnets.

According to an embodiment of the present invention the skew angle (or skew angles) defining the orientation or orientation of the permanent magnet systems with respect to the axial direction is selected to reduce axial vibration during operation of the transducer. Finding the optimal skew angle may be a compromise between maximizing the width of the permanent magnet system (in particular circumferential width) (requiring decreasing the skew angle) and reducing the undesired vibrations or vibration modes (requiring increasing the skew angle). Simulations (in particular taking into account the geometry, used materials and intended operation conditions of the transducer) may be performed, in order to determine the optimized skew angle, on one hand improving the efficiency or energy output of the electromechanical transducer and on the other hand reducing vibrations leading to undesired noise emissions.

According to an embodiment of the present invention the electromechanical transducer is configured as a generator. The generator may be comprised in a wind turbine and may be mechanically connected to a main shaft of the wind turbine at which plural rotor blades are connected.

Particular embodiments of the present invention are now described with reference to the accompanying drawings. The invention is not limited to the described or illustrated embodiments.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF INVENTION

Figure 1:
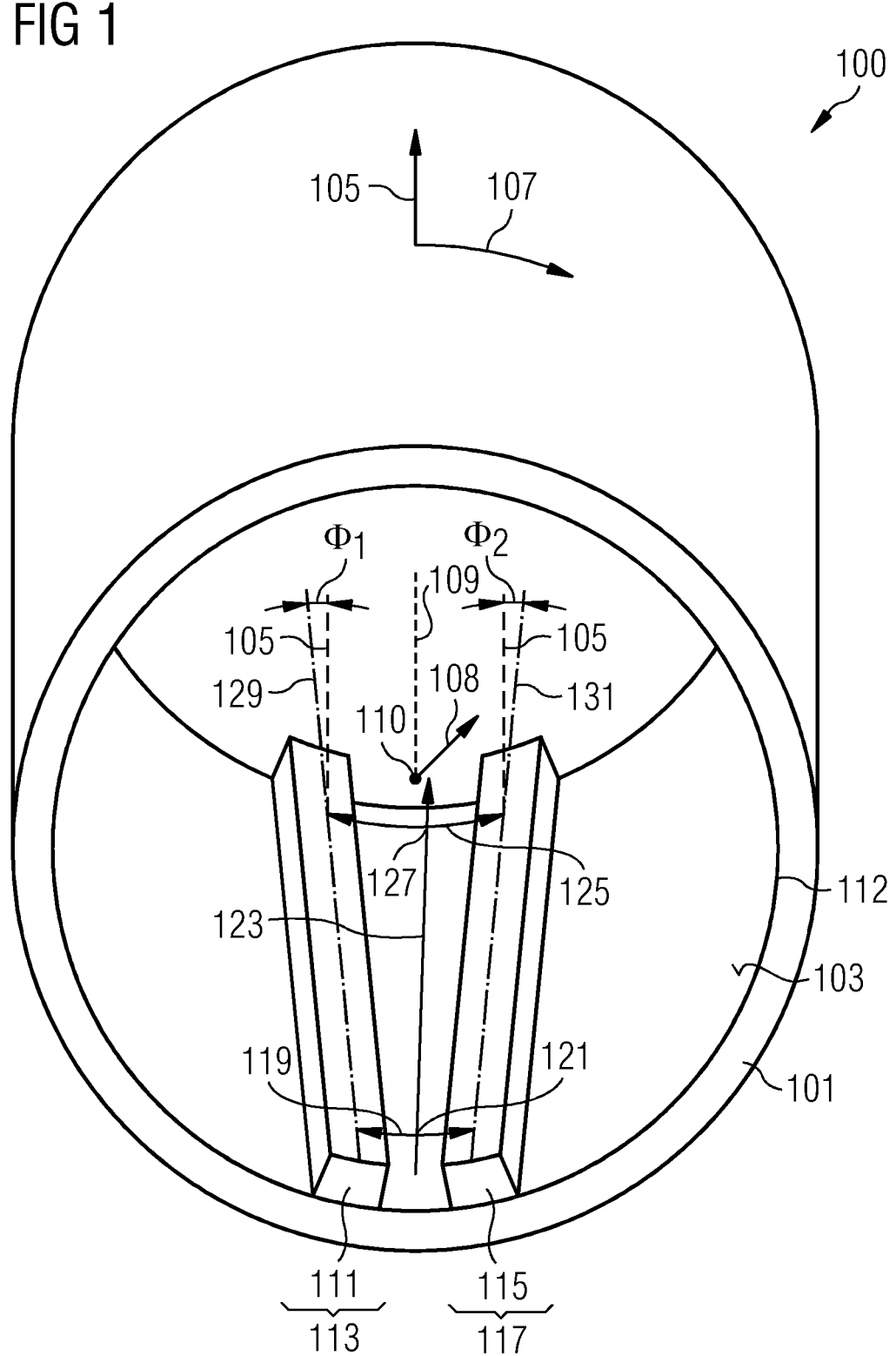
FIG. 1 schematically illustrates a perspective view of a rotor arrangement according to an embodiment of the present invention.

FIG. 1 illustrates a perspective view of a rotor arrangement 100 according to an embodiment of the present invention. The rotor arrangement 100 comprises a support structure 101, which provides a mounting surface 103 extending in an axial direction 105 and in a circumferential direction 107, wherein the support structure is intended to be rotated around a rotation axis 109 which runs along the axial direction 105. In particular, the support structure 101 is circular in shape and has a cylindrical configuration. The radial direction 108 is indicated in FIG. 1 as pointing from the center 110 of the circle 112 outwards towards the mounting surface 103 of the support structure 101.

The rotor arrangement 100 comprises a first permanent magnet system 111 which is mounted at the mounting surface 103 at a first circumferential region 113. Further, the rotor arrangement 100 comprises a second permanent magnet system 115 which is arranged at the mounting surface 103 at a second circumferential region 117. In particular, the first permanent magnet system 111 is adjacent to the second permanent magnet system 115.

A first circumferential distance 119 between the first permanent magnet system 111 and the second permanent magnet system 115 at a first axial position 121 (along a line 123 running in the axial direction 105 or at least being parallel to the rotation axis 109) differs from a second circumferential distance 125 between the first permanent magnet system 111 and the second permanent magnet system 115 at a second axial position 127.

In particular, the circumferential distance 121 is smaller than the circumferential distance 125 such that the first permanent magnet system 111 is non-parallel to the second permanent magnet system 115. In particular, the first permanent magnet system is comprised of a single permanent magnet having a first main extension direction 129 and also the second permanent magnet system 115 is constituted by a single permanent magnet having a second main extension direction 131. The first main extension direction 129 may be constructed or defined as a best fitting line through cross-sectional centers (either geometrical centers or magnetic centers or mass centers) of the first permanent magnet system 111. Further, the second main extension direction of the second permanent magnet system 115 may be defined or constructed as a best fitting line through plural cross-sectional centers (either geometrical centers or magnetic centers or mass centers) of the second permanent magnet system 115.

As is apparent from FIG. 1 the first main extension direction 129 of the first permanent magnet system 111 deviates from the axial direction 105 by an angle $\Phi_1$ and the second main extension direction 131 deviates from the axial direction 105 by the skew angle $\Phi_2$. In particular, the angles $\Phi_1$, $\Phi_2$ are inclined relative to the axial direction 105 in an opposite way ($\Phi_1 = \Phi_2$), thereby causing the different circumferential distances between the first permanent magnet system 111 and the second permanent magnet system 115 at the first axial position 121 and the second axial position 127, respectively. The rotor arrangement 100 comprises further permanent magnet systems which are evenly distributed along the circumferential direction 107 at the mounting surface 103 which, however, are not illustrated in FIG. 1.

The rotor arrangement 100 may for example be used as an outer rotor in an electrical generator which is in particular employed in a wind turbine.

Figure 2:
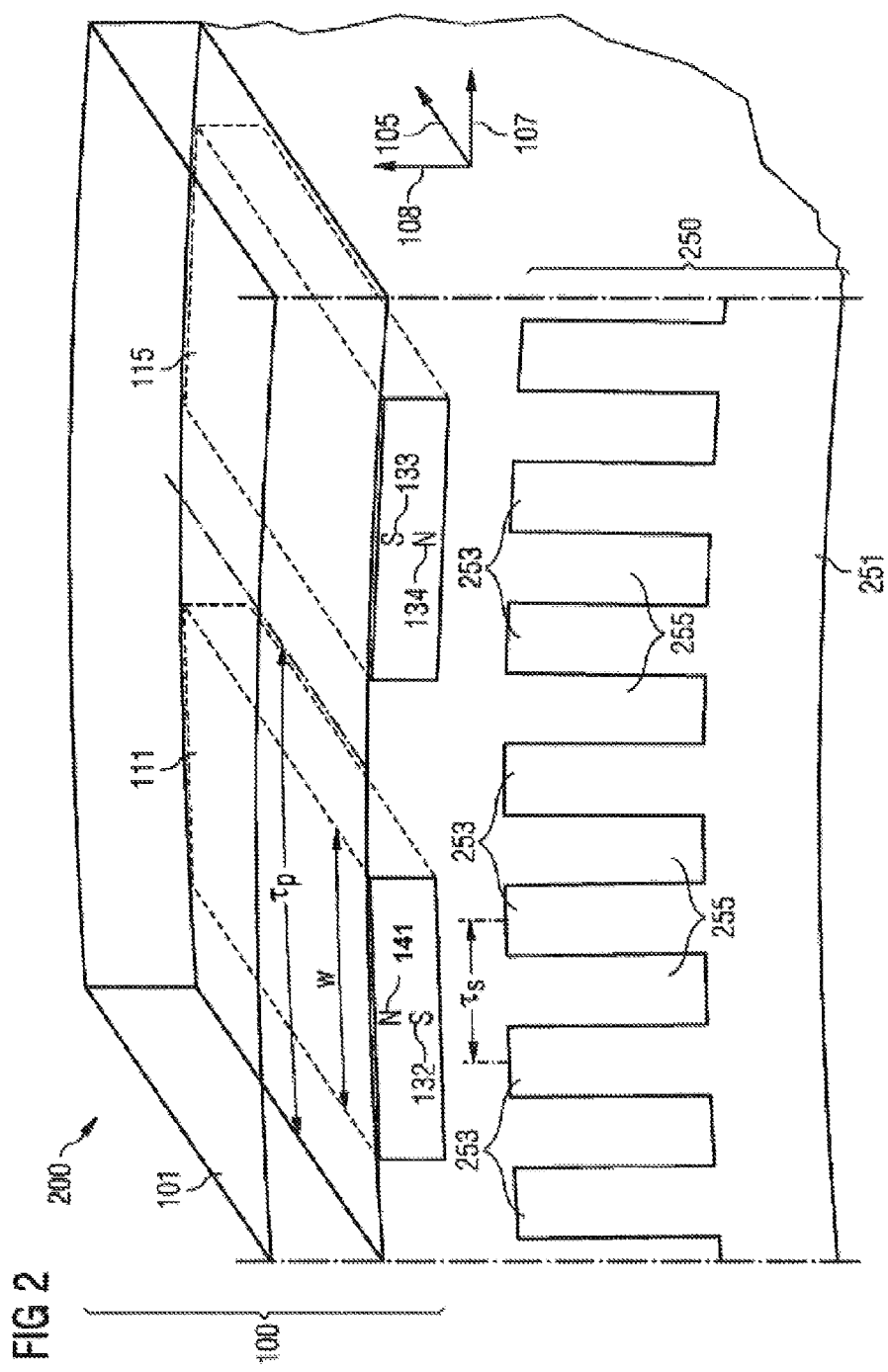
FIG. 2 schematically illustrates a perspective view of a portion of an electromechanical transducer according to an embodiment of the present invention for definition of parameters.

FIG. 2 illustrates a schematic perspective view representing a portion of a generator 200, in particular using the rotor arrangement 100 illustrated in FIG. 1. The generator 200 illustrated in FIG. 2 comprises the rotor arrangement 100 illustrated in FIG. 1 and further a stator portion 250 comprising a yoke 251 having plural teeth 253 for forming slots 255 between adjacent teeth 253. The distance between adjacent teeth 253 (i.e. the tooth pitch) is denoted as $\tau_s$, as is indicated in FIG. 2. Around the teeth, i.e. within the slots 255 wires are wound for forming coils which are, however, not illustrated in FIG. 2.

The first permanent magnet system 111 and the second permanent magnet system 115 together form a magnet pole pair. The width of the first permanent magnet system 111 is indicated as w.

In FIG. 2 also the axial direction 105, the circumferential direction 107 and the radial direction 108 are indicated. The first permanent magnet system 111 has its north pole 141 arranged radially outwards from its south pole 132 and the second permanent magnet system 115 has its south pole 133 radially positioned outwards from its north pole 134. The quantity $\tau_p$ indicated in FIG. 2 is also called the pole pitch relating not to the physical extent of the magnetic system (which is denoted as w) but relating to the magnetic extent of the magnet system in the circumferential direction 107. In particular, the period of the magnetic field generated by the first permanent magnet system and the second permanent magnet system 115 corresponds to two times $\tau_p$.

In FIGS. 3 to 6 an element or a structures which is similar in structure and/or functions to an element illustrated in FIG. 1 is denoted with same reference sign differing only in the first digit. Description of these corresponding elements can therefore be taken from the description of the corresponding elements described with reference to FIG. 1.

Figure 3:
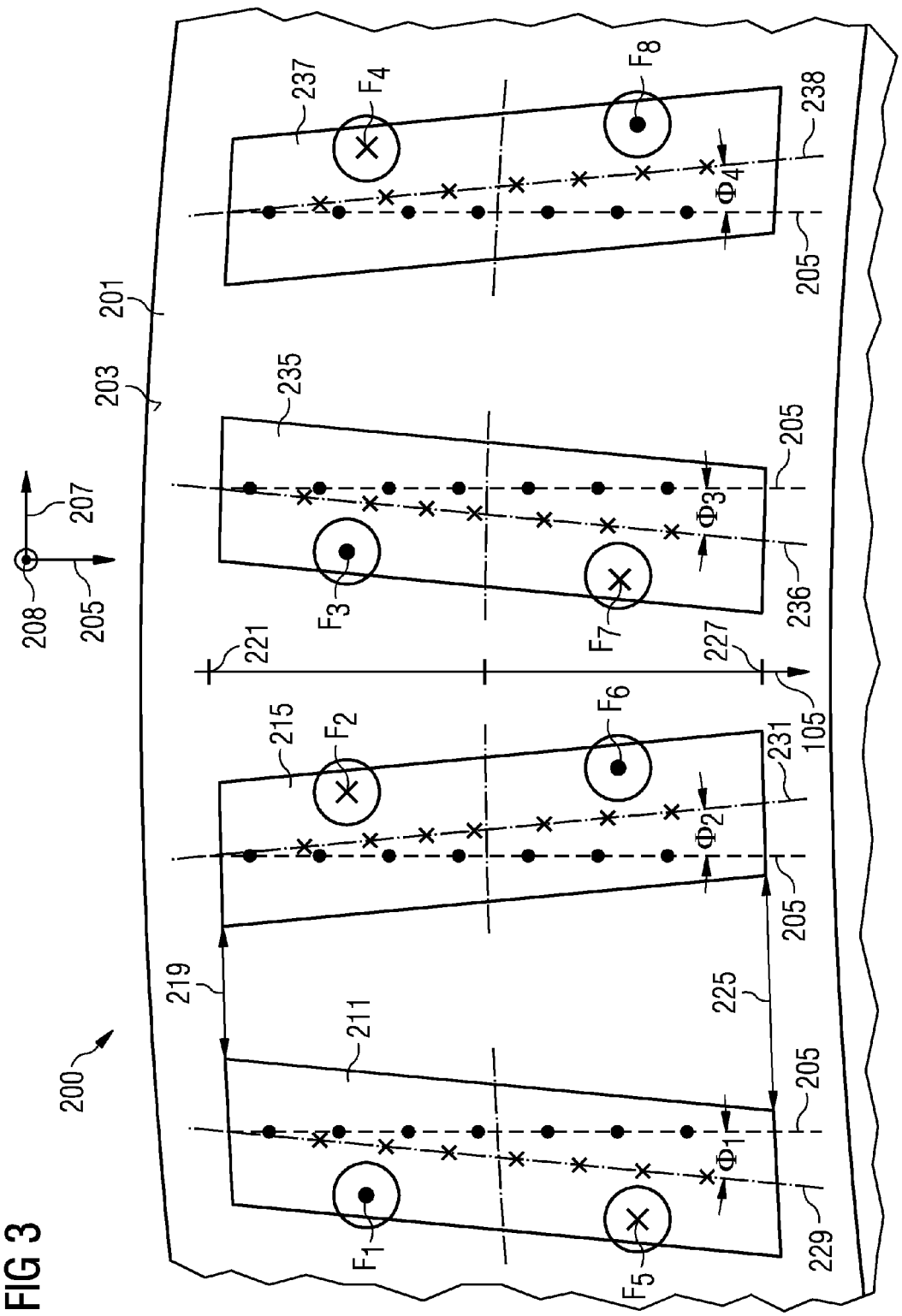
FIG. 3 schematically illustrates a schematic view of a radial projection of a portion of a rotor arrangement according to an embodiment of the present invention.

FIG. 3 schematically illustrates a view of a projection in the radial direction 208 of a rotor arrangement 200 according to an embodiment of the present invention.

The rotor arrangement 200 comprises a first permanent magnet 211 having a first main extension direction 229, which is inclined relative to the axial direction by an angle $\Phi_1$. Further, the rotor arrangement 200 comprises a second permanent magnet 215 having a second main extension direction 231 which is inclined relative to the axial direction 205 by an angle $\Phi_2$. Further, the rotor arrangement 300 comprises a third permanent magnet 235 having a main extension direction 236 which is inclined relative to the axial direction 205 by an angle $\Phi_3$. Further, the rotor arrangement 300 comprises a fourth permanent magnet 237 having a main extension direction 238 which is inclined relative to the axial direction 205 by an angle $\Phi_4$.

Thereby, a first circumferential distance 219 between the first permanent magnet 211 at a first axial position 221 is smaller than a circumferential distance 225 between the first permanent magnet 211 and the second permanent magnet 215 at a second axial position 227. Further, according to this embodiment illustrated in FIG. 3 the circumferential distance 219 equals or corresponds to a circumferential distance between the second permanent magnet 215 and the third permanent magnet 235 at the second axial position 227 and also the circumferential distance 219 equals or corresponds to the circumferential distance between the third permanent magnet 235 and the fourth permanent magnet 237 at the first axial position 221.

Further, as can be seen from FIG. 3, the circumferential distance 219 at the first axial position 221 increases linearly to the circumferential distance 225 at the second axial position 227.

Further, the circumferential distance 225 corresponds or equals to the circumferential distance between the second permanent magnet 215 and the third permanent magnet 235 at the first axial position 221. Further, the circumferential distance 225 equals or corresponds to the circumferential distance between the third permanent magnet 235 and the fourth permanent magnet 237 at the second axial position 227.

In particular, the magnet pole pair formed by the first permanent magnet 211 and the second permanent magnet 215 is rotationally symmetry related to the further magnet pole pair formed by the third permanent magnet 235 and the fourth permanent magnet 237.

In FIG. 3 the indicated forces $F_1$, $F_2$, $F_3$, $F_4$, $F_5$, $F_6$, $F_7$ and $F_8$ denote forces during operation of the rotor arrangement 200 used in an electromechanical transducer, wherein the forces $F_1$, $F_3$, $F_6$ and $F_8$ denote forces directed radially outwards, while the forces $F_2$, $F_4$, $F_5$ and $F_7$ denote forces pointing radially inwards. As is apparent from the illustrated forces in FIG. 3 the forces acting on a single magnet system cancel out, e.g. the forces $F_1$ (pointing radially outward) and $F_5$ (pointing radially inwards) act on the first permanent magnet 211, thus result in a net force of zero.

Further, as is apparent from FIG. 3 forces acting at a particular axial position (for example between the position 221 and 227 denoting the first axial position and second axial position, respectively) are in sum zero, thus cancel out each other when summing along the circumferential direction 207 (e.g. the sum of $F_1$, $F_2$, $F_3$, $F_4$ is zero). Thereby, axial vibration may be reduced.

In particular, the angles are $\Phi_1=-\Phi_2$ and $\Phi_3=-\Phi_4$ and $\Phi_1=\Phi_3$. Thus, the skew angles have alternatingly changing signs. Thereby, the force vector $F_1$-$F_8$ balance out in the circumferential direction 207 as well as in the axial direction 205. In other words, the axial vibration mode may change from (1, 1) in a conventional skew to (2P, 1) in the proposed non-parallel skew, where P is the number of magnet poles in the complete rotor arrangement. Since the achieved mode of axial vibration based on the embodiment of the present invention is much larger than that obtained from a conventional Herring-Bone skew, it is realized that the damping of axial vibration obtained by the non-parallel skew may be much more significant or effective.

By skewing the magnet following the proposed non-parallel arrangement the edge of the magnets may become closer together at one end and farther apart from each other at the other end. Usually, the ratio $w/\tau_p$, as illustrated in FIG. 2, should generally be chosen to be very high to give maximum generator output. However, the non-parallel arrangement of adjacent permanent magnet as illustrated for example in FIG. 3 or in FIGS. 4 to 6, may impose a limitation to the ratio $w/\tau_p$ in order to avoid collision of the edges of adjacent magnets. Thereby, the generator output may be reduced.

However, by appropriate simulation an optimal compromise between maximizing the width w and avoiding undesired vibrations may be obtained.

Figure 4:
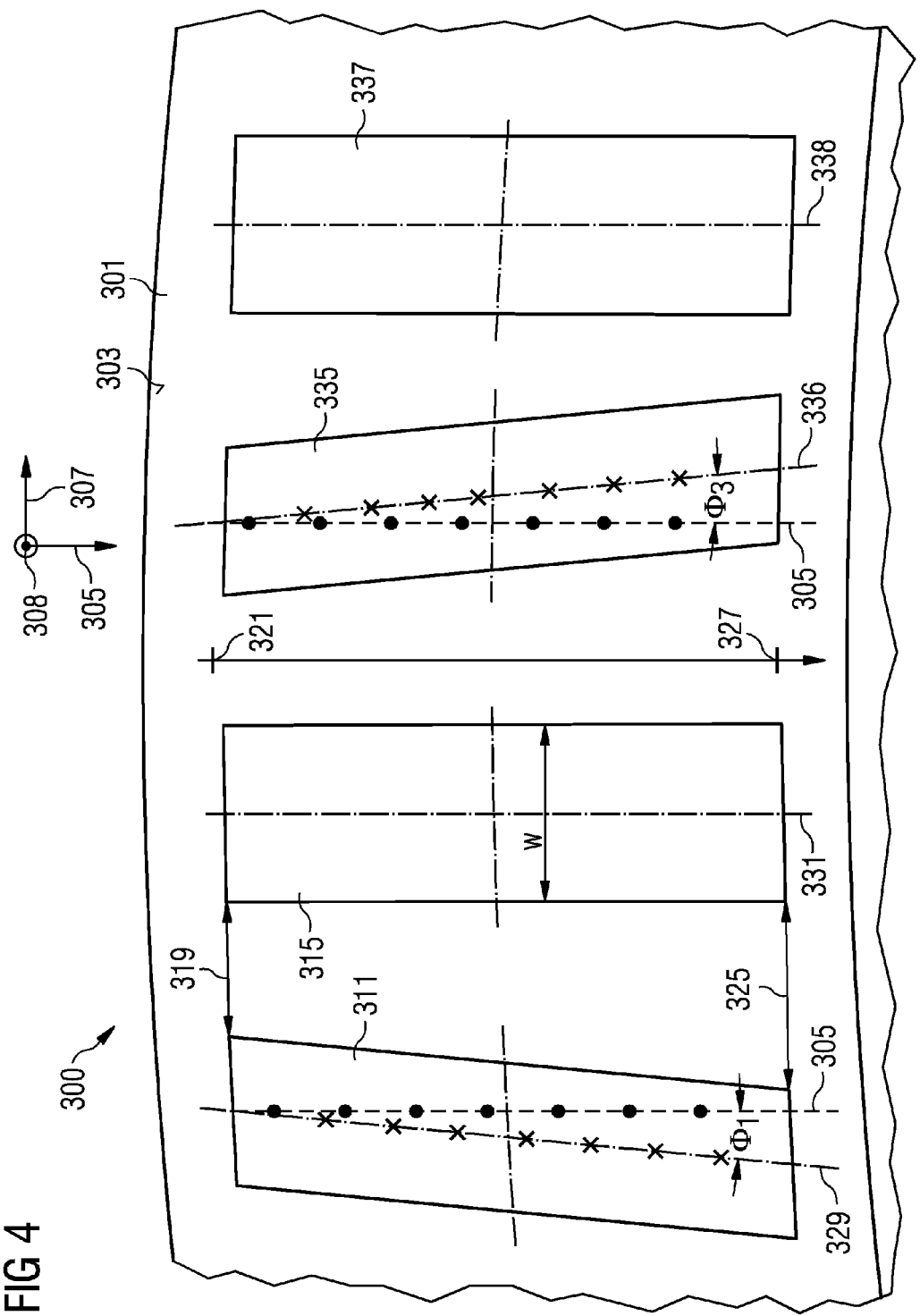
FIG. 4 schematically illustrates a schematic view of a radial projection of a portion of a rotor arrangement according to an embodiment of the present invention.

Further, in order to reduce the limiting effect or limiting factor and in order to keep the width w as large as possible a configuration as illustrated in FIG. 4 (or FIG. 6) is proposed. The rotor arrangement 300 illustrated in FIG. 4 (also as a radial projection in a schematic way) comprises the first permanent magnet 311 inclined relative to the axial direction 305 by the angle $\Phi_1$, the second permanent magnet 315 having its main extension direction 331 aligned with and thus parallel to the axial direction 305, a third permanent magnet 335 having its main extension direction 336 inclined by an angle $\Phi_3$ relative to the axial direction, and the fourth permanent magnet 337 having its main extension direction 338 aligned parallel to the axial direction 305. Further, in this embodiment $\Phi_1=-\Phi_3$. Thereby, the width w of the permanent magnet may be increased while still reducing undesired vibrations.

Figure 5:
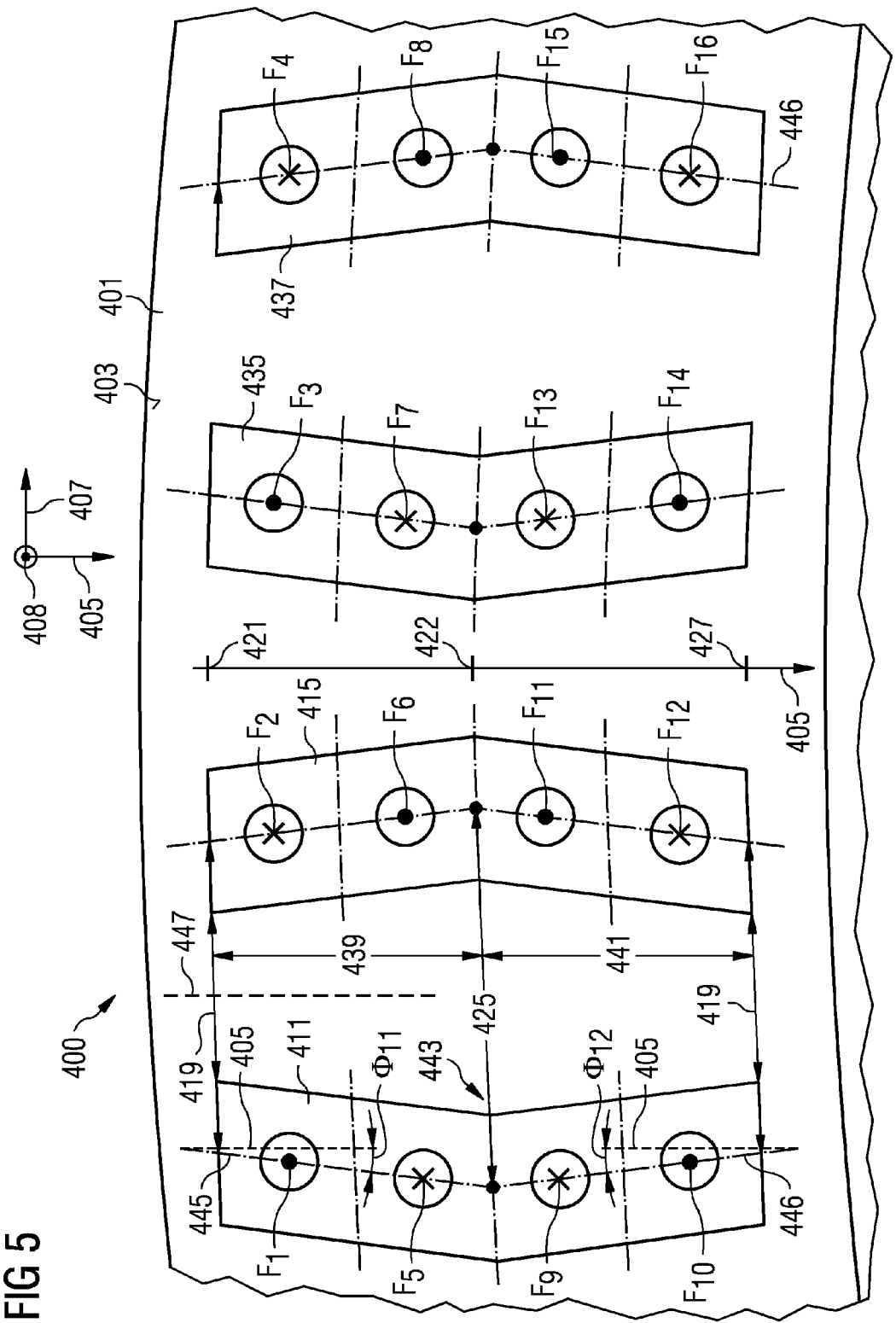
FIG. 5 schematically illustrates a schematic view of a radial projection of a portion of a rotor arrangement according to an embodiment of the present invention.

FIG. 5 illustrates a rotor arrangement 400 in a radial projection according to an embodiment of the present invention. The rotor arrangement 400 comprises a first permanent magnet 411, a second permanent magnet 415, a third permanent magnet 435 and a fourth permanent magnet 437, which are arranged at a same axial region between the first axial position 421 and the second axial position 427. All permanent magnets 411, 415, 435, 437 illustrated in FIG. 5 comprise a first section and a second section, wherein the first section is arranged between the first axial position 421 and the third axial position 422 and the second section is arranged between the third axial position 422 and the second axial position 427.

For clarity only the first section 439 and the second section 441 of the first permanent magnet 411 are illustrated in FIG. 5. Between the first section 439 and the second section 441 of the first permanent magnet 411 a kink 443 is provided, at which the extension direction changes. In particular, the first section 439 extends along a main extension direction 445 which is inclined relative to the axial direction 405 by an angle $\Phi_{11}$. Further, the main extension direction 446 of the second section 441 of the first magnet 411 is inclined relative to the axial direction 405 by an angle $\Phi_{12}$, wherein $\Phi_{11}=-\Phi_{12}$.

The second permanent magnet 415 has an arrangement resembling a mirror image of the first permanent magnet 411, wherein a (virtual) mirror plane 447 (extending in the axial direction 405 and the radial direction 408) is arranged between the first permanent magnet 411 and the second permanent magnet 415.

Further, the circumferential distance between the first permanent magnet 411 and the second permanent magnet 415 increases between the first axial position 421 and the third axial position 422 from the value 419 and 425 and then decreases from the third axial position 422 to the second axial position 427 to become the distance 419 again. Thereby, the circumferential distance between two permanent magnets may be measured between edges of the permanent magnet or between respective main extension directions.

The third permanent magnet 435 and the fourth permanent magnet 437 are rotationally symmetry related to the first permanent magnet 411 and the second permanent magnet 415.

Figure 6:
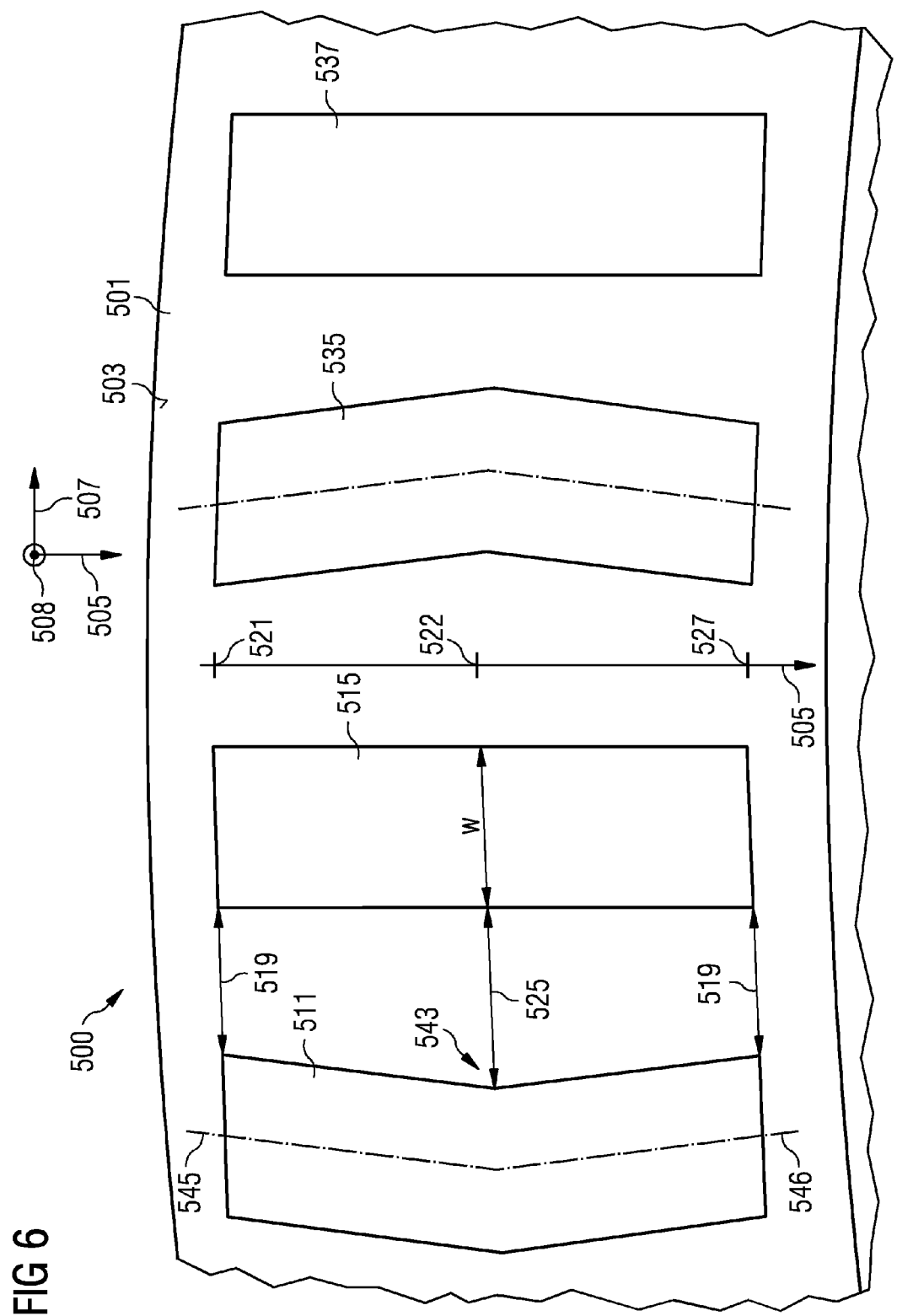
FIG. 6 schematically illustrates a schematic view of a radial projection of a portion of a rotor arrangement according to an embodiment of the present invention.

FIG. 6 schematically illustrates a rotor arrangement 500 comprising a first permanent magnet 511, a second permanent magnet 515, a third permanent magnet 535 and a fourth permanent magnet 537. The first permanent magnet 511 has a same configuration as the first permanent magnet 411 of the embodiment illustrated in FIG. 5. Further, the second permanent magnet 515 has the same configuration and arrangement as the second permanent magnet 315 illustrated in FIG. 4. Thereby, in particular a width w of the permanent magnet may be increased, while maintaining reduction of undesired vibration modes.

All permanent magnets illustrated in FIGS. 3 to 6 may also be constituted from plural individual distinct magnets which are arranged side by side along the axial direction or along the respective main extension direction. Thereby, the circumferential distance between two neighbouring permanent magnet systems may in particular change in a step-wise manner. According to another embodiment the permanent magnet may comprise more than one kink such that for example the permanent magnets comprise plural axial sections having alternating main extension directions, thereby forming a zig-zag structure.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A rotor arrangement, comprising:
a support structure providing a mounting surface extending in an axial direction and a circumferential direction, the support structure being adapted to rotate around the axial direction;
a first permanent magnet system arranged at the mounting surface at a first circumferential region; and
a second permanent magnet system arranged at the mounting surface at a second circumferential region;
wherein a circumferential distance between the first magnet system and the second magnet system at a first axial position differs from the circumferential distance between the first magnet system and the second magnet system at a second axial position;
wherein the first permanent magnet system is inclined with respect to the axial direction in the circumferential direction between the first axial position and the second axial position; and
wherein the second permanent magnet system is inclined with respect to the axial direction in an opposite circumferential direction between the first axial position and the second axial position;
wherein the first permanent magnet system comprises a first magnet and the first magnet comprises a kink between a first section and a second sections; and
wherein the first section and the second section extend in different directions inclined relative to the axial direction.

2. The rotor arrangement according to claim 1, wherein the circumferential distance increases continuously or in a stepwise manner from the first axial position to the second axial position.

3. The rotor arrangement according to claim 1, wherein the circumferential distance increases continuously or in a stepwise manner from the first axial position to a third axial position,
wherein the distance decreases continuously or in a stepwise manner from the third axial position to second axial position.

4. The rotor arrangement according to claim 1, wherein the first permanent magnet system and the second permanent magnet system extends at the mounting surface across a same axial region.

5. The rotor arrangement according to claim 1, wherein the first permanent magnet system comprises at least a first part arranged at the first axial position and a second part arranged at the second axial position, and/or
wherein the second permanent magnet system comprises at least a first part arranged at the first axial position and a second part arranged at the second axial position.

6. The rotor arrangement according to claim 1,
wherein the second permanent magnet system constitutes a single second magnet.

7. The rotor arrangement according to claim 6, wherein the first magnet has a straight edge, in particular along its entire axial extent, and/or
wherein the single second magnet has a straight edge, in particular along its entire axial extent.

8. The rotor arrangement according to claim 6, wherein the first section is inclined relative to the axial direction in the circumferential direction.

9. The rotor arrangement according to claim 6, wherein the second section is inclined relative to the axial direction in the opposite circumferential direction or runs along the axial direction.

10. The rotor arrangement according to claim 6, wherein a non-parallel Herring-Bone type arrangement is achieved.

11. The rotor arrangement according to claim 1, wherein the first magnet system and the second magnet system have different magnetic orientations.

12. The rotor arrangement according to claim 1, further comprising:
a third permanent magnet system arranged at the mounting surface at a third circumferential region;
a fourth permanent magnet system arranged at the mounting surface at a fourth circumferential region;
wherein a circumferential distance between the third magnet system and the fourth magnet system at the first axial position differs from the circumferential distance between the first magnet system and the second magnet system at the second axial position,
wherein a circumferential distance between the second magnet system and the third magnet system at the first axial position differs from the circumferential distance between the second magnet system and the third magnet system at the second axial position.

13. The rotor arrangement according to claim 12, wherein the second magnet system has rotational symmetry related around the axial direction to the fourth magnet system.

14. The rotor arrangement according to claim 12, wherein the first magnet system has rotational symmetry related around the axial direction to the third magnet system.

15. An electromechanical transducer, comprising:
a stator having plural teeth having a slot between adjacent teeth;
a rotor arrangement according to claim 1.

16. The electromechanical transducer according to claim 15, wherein a skew angle is selected to reduce axial vibration during operation of the transducer.

17. A rotor arrangement comprising: a support structure providing a mounting surface extending in an axial direction and a circumferential direction, the support structure being adapted to rotate around the axial direction;
a first permanent magnet system arranged at the mounting surface at a first circumferential region; and
a second permanent magnet system arranged at the mounting surface at a second circumferential region;
wherein a circumferential distance between the first magnet system and the second magnet system at a first axial position differs from the circumferential distance between the first magnet system and the second magnet system at a second axial position;
wherein the first permanent magnet system is inclined with respect to the axial direction in the circumferential direction between the first axial position and the second axial position;
wherein the second permanent magnet system is inclined with respect to the axial direction in an opposite circumferential direction between the first axial position and the second axial position; further comprising:
a third permanent magnet system arranged at the mounting surface at a third circumferential region;
a fourth permanent magnet system arranged at the mounting surface at a fourth circumferential region;
wherein a circumferential distance between the third magnet system and the fourth magnet system at the first axial position differs from the circumferential distance between the first magnet system and the second magnet system at the second axial position,
wherein a circumferential distance between the second magnet system and the third magnet system at the first axial position differs from the circumferential distance between the second magnet system and the third magnet system at the second axial position; and wherein the first magnet system is not rotationally symmetric related around the axial direction to the third magnet system.

* * * * *